United States Patent [19]

Klauck

[11] 4,331,537

[45] May 25, 1982

[54] APPARATUS FOR FILTERING A LIQUID

[75] Inventor: Manfred Klauck, Lebach, Fed. Rep. of Germany

[73] Assignee: Flutec Fluidtechnische Gerate GmbH, Sulzbach, Fed. Rep. of Germany

[21] Appl. No.: 167,690

[22] Filed: Jul. 16, 1980

[30] Foreign Application Priority Data

Jul. 11, 1979 [DE] Fed. Rep. of Germany ....... 2927970

[51] Int. Cl.³ .............................................. B01D 29/10
[52] U.S. Cl. .................................. 210/416.1; 210/435; 210/451; 210/455; 415/121 G
[58] Field of Search .................... 210/416.1, 455, 450, 210/451, 435, 416.2, 416.3, 416.4, 416.5; 415/121 G, 121 R

[56] References Cited

U.S. PATENT DOCUMENTS 3,685,919  8/1972  Speck et al. ...................... 210/416.2
4,059,519  11/1977  Zieg ...................................... 210/451

FOREIGN PATENT DOCUMENTS 1024890  4/1966  United Kingdom ........... 415/121 G

Primary Examiner—Benoit Castel
Attorney, Agent, or Firm—Roylance, Abrams, Berdo & Farley

[57] ABSTRACT

A compact apparatus for filtering a liquid, such as hydraulic oil, including a filter housing having an inlet and an outlet, a filter element located therein, a rotary pump adjacent the filter housing and a separating element located inside the filter housing for separating the suction side and the pressure side of the pump. The filter element and the rotary pump are coaxially aligned and closely adjacent.

7 Claims, 1 Drawing Figure

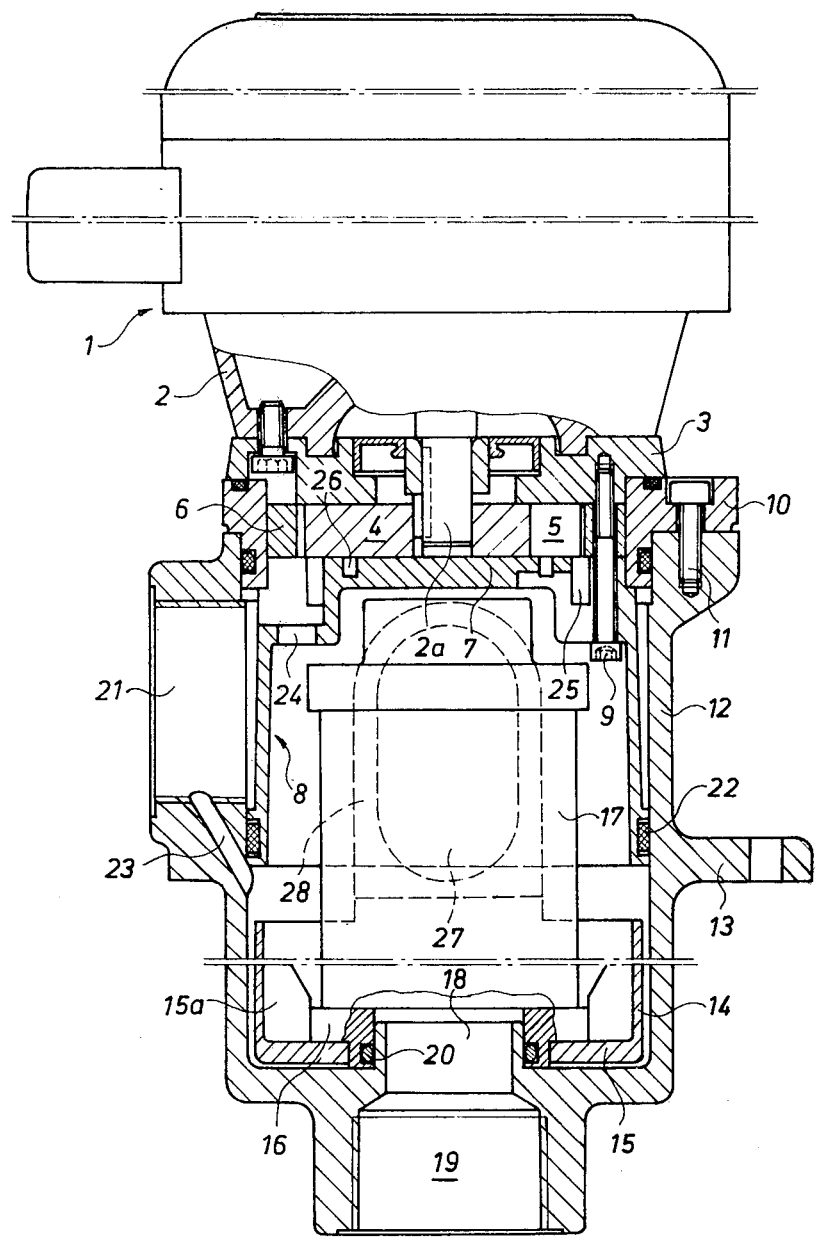

APPARATUS FOR FILTERING A LIQUID

FIELD OF THE INVENTION

The present invention relates to a very compact apparatus for filtering a liquid including a rotary feed pump and a filter element which are coaxially aligned and closely adjacent. A separating element enclosing the filter element separates the suction side and the pressure side of the rotary pump.

BACKGROUND

Filtering apparatus, especially for hydraulic oil, typically are very heavy and take up large amounts of space. This is because a housing for the filter as well as a housing for a pump must be provided with a connecting passageway located therebetween.

SUMMARY OF THE INVENTION

Accordingly, it is a primary object of the present invention to provide an apparatus for filtering a liquid which is light in weight and which is compact.

Another object of the present invention is to provide such an apparatus where the liquid feed pump and the filter element are coaxially aligned and closely adjacent.

Another object of the present invention is to provide such an apparatus in which a separating element receiving the filter element therein separates the suction side and the pressure side of the pump which is of the rotary, roller-cell type.

The foregoing objects are basically attained by providing in an apparatus for filtering a liquid including a potshaped filter housing having an open side and having a filter element disposed therein between an inlet and an outlet of the filter housing and a pump housing having a liquid feed pump therein and located adjacent the filter housing, wherein the improvement comprises means for supporting the feed pump at the open side of the potshaped filter housing; and separating means, located inside the filter housing, for separating the suction side and the pressure side of the feed pump, the separating means partially surrounding the filter element and connecting the pressure side of the feed pump with the filter element.

Advantageously, the separating means is a potshaped element with an open side facing away from the feed pump. This pump is advantageously formed as a rotary, roller-cell pump with the separating element separating the suction side and the pressure side of the feed pump. This separating element also forms a part of the pump housing. The separating element and the filter housing are substantially tubular and are substantially coaxially aligned. In addition, the filter housing supports the filter element substantially coaxially with the feed pump.

Other objects, advantages and salient features of the present invention will become apparent from the following detailed description which, taken in conjunction with the annexed drawing, discloses a preferred embodiment of the present invention.

DRAWING

Referring now to the sole drawing which forms a part of this original disclosure, the apparatus in accordance with the present invention is shown in partial, longitudinal section.

DETAILED DESCRIPTION OF THE INVENTION

As seen in the drawing, the apparatus in accordance with the present invention comprises a filter housing 12 having an inlet 21 and an outlet 19, a filter element 17 located inside the housing 12, a rotary feed pump including a rotor 4 and a plurality of rollers 5, a separating element 8 located inside the filter housing 12 and having a bottom wall 7 adjacent the feed pump, and a pump housing formed from an annular plate 3, a guide ring 6 and the bottom wall 7 of the separating element 8.

An electric motor 1 has a shaft housing 2 from which a shaft but 2a projects. The shaft butt penetrates an annular plate 3 which is attached via screws to the shaft housing 2 and carries a rotor 4 of a rotary, roller-cell pump, of which one roller 5 has been shown. The rotor 4 and the rollers 5 are surrounded by a guide ring 6. On the side facing away from the annular plate 3, there is the bottom wall 7 of the potshaped separating element 8 which on the opposite end has an open side facing downward as seen in the drawing. As used herein, "potshaped" means an article which is substantially tubular having a closed end and an open end or side. The annular plate 3, the guide ring 6 and the bottom wall 7 form the housing of the liquid feed pump and contain the rotor 4 and rollers 5 therein. The separating element 8 is connected rigidly, by means of screws 9 penetrating the guide ring 6, with the annular plate 3.

The guide ring is surrounded by an annular flange 10, which is held laterally by the annular plate 3 and the separating element 8. On the annular flange 10, a potshaped filter housing 12 having an open side facing upwards is attached by means of screws 11, the housing 12 having an attaching flange 13 perforated by holes.

Inside the filter housing 12, a potshaped insert part 14 having an open side facing upwardly is located with radial clearance in such a way that its bottom wall 15 is located in the bottom of the filter housing 12, and so that the open sides of the insert part 14 and the separating element are facing each other. The insert part 14 in the area of its bottom has ribs 15a projecting radially inward, which ribs serve to receive the lower edge 16 of the filter element 17. This filter element 17 has an upper edge which projects into the separating element 8 and reaches closely adjacent to the bottom wall 7 thereof. The lower edge 16 of the exchangable or replaceable filter element 17 encompasses a collar 18 projecting inwards and provided on the filter housing 12, which collar partially surrounds the outlet 19 disposed on the bottom 15 of the insert part 14. Between the collar 18 and the lower edge 16, a liquid-tight gasket 20 is disposed. A collar projecting downwards on the filter element 17 projects into the bottom 15 of the insert part 14 on which the lower edge 16 of the filter element is supported.

The filter housing 12 has its inlet 21 near its edge adjacent the electric motor 1. A screw connection, not shown, may be used in the outlet 19 as well as in the inlet 21.

The separating element 8 has its open side, which is the lower edge, extending below the lower side of the inlet 21. Between this lower edge of the separating element 8 and the filter housing 12, a liquid-tight sealing ring 22 is disposed, the separating element 8 thus being telescopically received in the filter housing 12. The filter housing 12 supports the filter element 17 substantially coaxially with the liquid feed pump, as seen in the drawing.

The inlet 21 is connected by means of a channel or bore 23 with the inner space of the filter housing 12. This channel 23 leads to the inlet 21 on the outside of the screw connection which has an annular groove on its periphery.

The separating element is formed so that, in the area of its bottom wall 7, there is a connection between the inlet 21 in the filter housing 12 and the inlet of the feed pump formed by the annular plate 3, rotor 4, roller 5, guide ring 6 and bottom wall 7. This is seen as a passageway in the drawing just above hole 24 in separating element 8. In the part which is graduated for this inlet purpose, hole 24 is adapted to receive a non-return valve which operates as an excess pressure valve and opens in the direction toward the inlet and, although not shown, may be inserted so that the valve seat may be provided on the part surrounding the hole 24. Thus, the inlet of the feed pump described above establishes the suction side of the pump. On the other hand, the bottom wall 7 on the side opposite of the inlet forms an outlet for the pump which is at the pressure side thereof including an arcshaped slit 25 opening toward the inside of the separating element 8. In addition, in the bottom wall 7 of the separating element, an annular groove 26 is provided on the side of the rotor 4.

The insert part 14 has lateral parts 28 extending on both sides and is provided with an elongated hole 27, these two parts 28 projecting into the inside of the separating element 8 and, in the situation where the separating element 8 is removed, serve for the removal of the filter element 17 from the filter housing 12. The filter element 14 with the lateral parts 28 are formed from an elastic, plastic material.

During operation of the apparatus to filter a liquid, the liquid feed pump aspirates the pressure agent in the form of a liquid, such as hydraulic oil, via inlet 21 and forces it by way of the slit 25 into the inside of the separating element 8, where it flows through the filter element 17 and emerges via the outlet 19.

In more detail, the liquid flows into inlet 21, then proceeds into the suction side of the feed pump above hole 24 in separating element 8, then through the pump and out the opposite, pressure side via slit 25 into the separating element, through the insert part 14, into, through and then out the filter 17, out the collar 18 and finally through outlet 19 in the filter housing 12.

The degree of contamination of the filter element may be read from a contamination recorder, for example, a manometer, which is attached in the area of the inlet 21 and is connected by way of the channel 23 with the inside of the filter housing 12. Whenever the filter element 17 is fouled to a predetermined degree, then the inside of the separating element 8 is connected with the pressure side of the feed pump by way of the non-return valve insertable into the hole or bore 24 which can be threaded.

Thus, the previously described embodiment is a simple, compact apparatus for filtering a pressure agent in the form of a liquid such as hydraulic oil and is advantageously used mainly as a stationary secondary-stream filter unit. The pressure agent is filtered continuously and is independent of the overall pressure agent system connected to the same supply container as the apparatus.

While one advantageous embodiment has been chosen to illustrate the invention, it will be understood by those skilled in the art that various changes and modifications can be made therein without departing from the scope of the invention as defined in the appended claims.

What is claimed is:

1. In an apparatus for filtering a liquid including a potshaped filter housing having an open side and having a filter element disposed therein between an inlet and an outlet of the filter housing and a pump housing having a liquid feed pump therein and located adjacent the filter housing, wherein the improvement comprises:
   means for supporting the feed pump at the open side of the potshaped filter housing; and
   separating means, located inside the filter housing, for separating the suction side and the pressure side of the feed pump,
   said separating means partially surrounding the filter element and connecting the feed pump with the filter element,
   said separating means being potshaped with an open side,
   said open side extending below the inlet in the filter housing,
   said separating means being rigidly coupled to a part of the pump housing,
   said separating means having a liquid passage to the filter element from the feed pump,
   said separating means and the filter housing being substantially tubular and having their longitudinal axes substantially parallel,
   said filter housing supporting the filter element so that the longitudinal axis thereof is substantially parallel with the longitudinal axis of the feed pump.

2. The improvement according to claim 1, wherein said separating means forms part of the pump housing.

3. The improvement according to claim 1, wherein said separating means has a bore adjacent the suction side of the feed pump adapted for the connection of an excess pressure valve which is adapted to be opened from the pressure side to the suction side of the feed pump.

4. The improvement according to claim 1, wherein said separating means is potshaped with an open side facing away from the feed pump.

5. The improvement according to claim 4, wherein said separating means is telescopically received in the filter housing with a liquid-tight seal interposed therebetween.

6. The improvement according to claim 1, wherein the feed pump is a rotary roller-cell pump.

7. In an apparatus for filtering a liquid including a potshaped filter housing having an open side and having a filter element disposed therein between an inlet and an outlet of the filter housing and a pump housing having a liquid feed pump therein and located adjacent the filter housing, wherein the improvement comprises:
   means for supporting the feed pump at the open side of the potshaped filter housing; and
   separating means, located inside the filter housing, for separating the suction side and the pressure side of the feed pump,
   said separating means partially surrounding the filter element and connecting the pressure side of the feed pump with the filter element,
   said separating means being potshaped with an open side, said open side extending below the inlet in the filter housing, said separating means being rigidly coupled to the pump housing, said separating means having a liquid passage to the filter element from the pressure of the feed pump, said separating means and the filter housing being substantially tubular and substantially coaxially aligned, said filter housing supporting the filter element substantially coaxially with the feed pump.

* * * * *